Dec. 24, 1946.  J. L. HURD  2,413,048
LOGGING APPARATUS
Filed Sept. 19, 1945  2 Sheets-Sheet 1
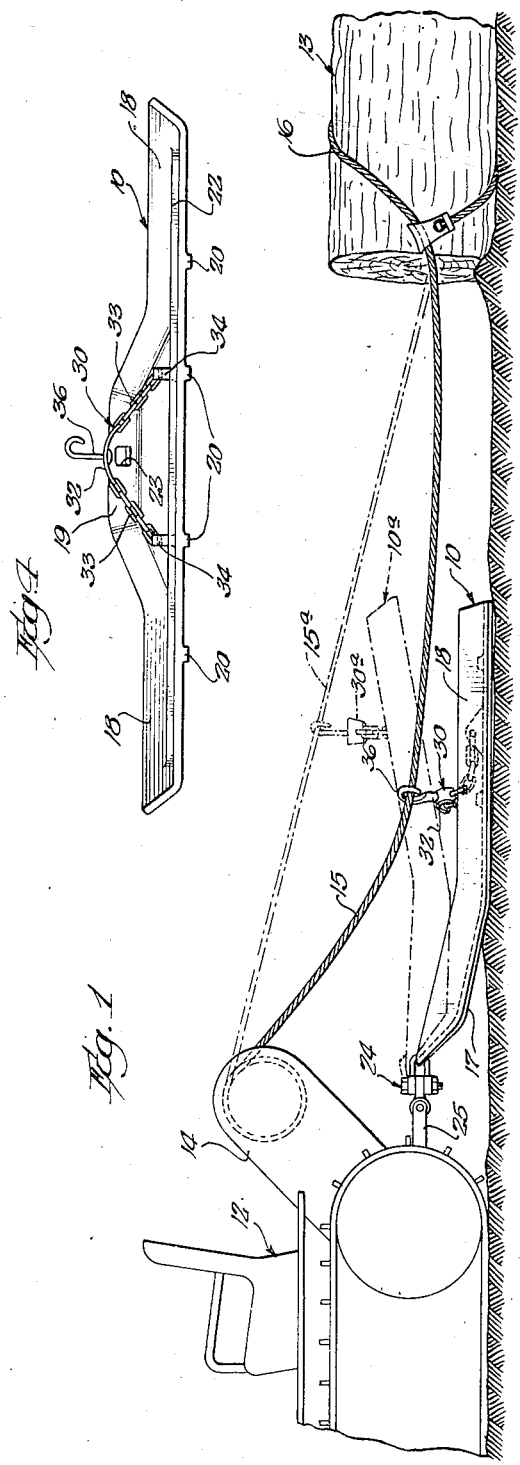
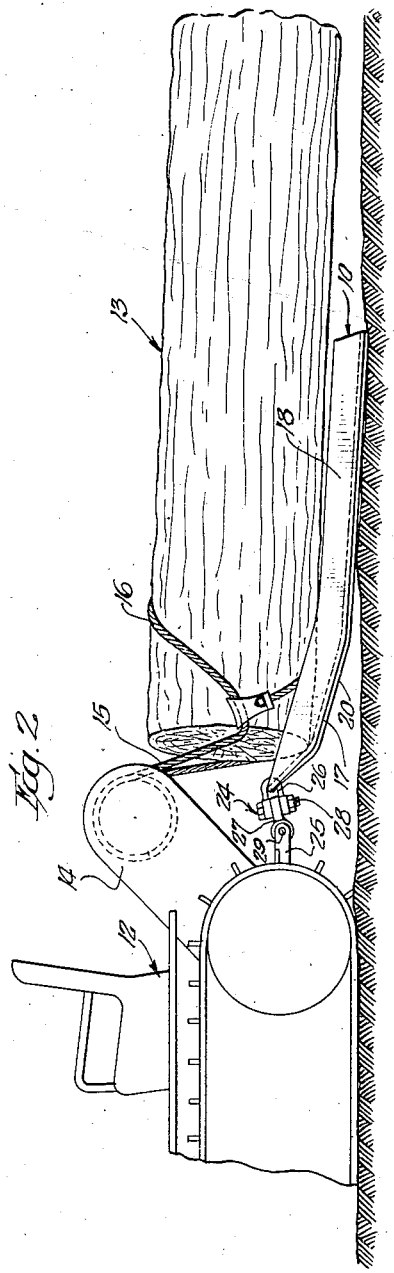
INVENTOR.
Jesse L. Hurd
BY
Albert G. McCaleb
Atty.

Dec. 24, 1946.　　　　J. L. HURD　　　　2,413,048
LOGGING APPARATUS
Filed Sept. 19, 1945　　　　2 Sheets-Sheet 2
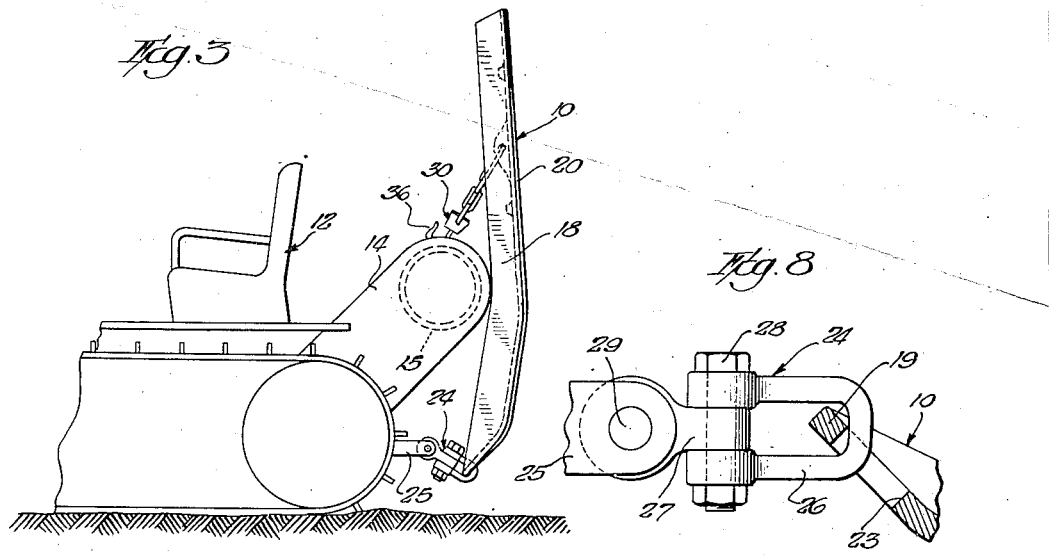
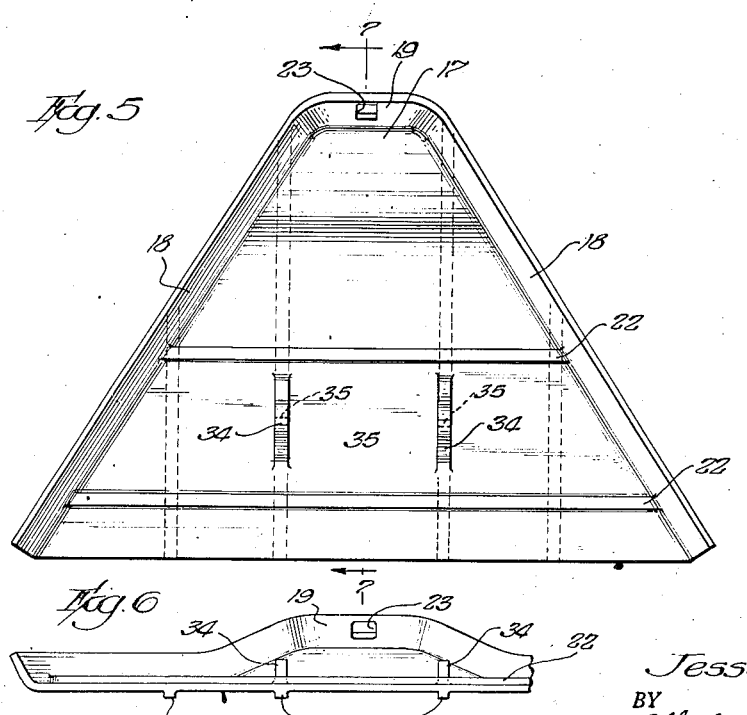
INVENTOR.
Jesse L. Hurd
BY
Albert G. McCaleb
Atty.

Patented Dec. 24, 1946

2,413,048

UNITED STATES PATENT OFFICE 2,413,048

LOGGING APPARATUS

Jesse L. Hurd, Pierce County, Wash.

Application September 19, 1945, Serial No. 617,315

8 Claims. (Cl. 214—65.3)

This invention relates to logging apparatus, and particularly to a logging pan and the rigging therefor adapted to use with a tractor or the like for dragging and for handling logs.

It is a general object of my invention to provide an improved logging pan and associated rigging for attachment to a tractor or the like and which facilitate both the handling and use of the pan and the loading and dragging of logs.

Another object of the invention is to provide a logging pan so shaped and constructed that although it is closely coupled to a tractor or the like, it may be manipulated to various positions relative to the tractor without interfering with the tractor structure.

My invention comprehends, as another object, the provision of a logging pan and rigging for the attachment of the pan to a tractor or the like in a manner such that the pan is angularly movable in transverse directions relative to the tractor and may be raised easily to a position off of the ground when the tractor is reversed or during movements of the tractor when no log is attached thereto.

A further object of my present invention is to provide a logging pan and associated rigging for attachment of the pan to a tractor which includes a coupling of sufficient rigidity to permit rearward movement of the pan by the driving force of the tractor, and yet having flexibility which allows the pan to be steered relative to the tractor.

My invention has for another object the provision of a logging pan having rigging connected thereto for use in cooperation with a drag line as an aid to the desired manipulation of the pan.

An additional object of my invention is to provide a logging pan and associated rigging which enable close snubbing of a log to a tractor, so that control of the log is maintained during movements of the tractor.

Other objects and advantages of the invention will be apparent from the following description and accompanying drawings in which similar characters of reference indicate similar parts throughout the several views.

Reference to the drawings, of which there are two sheets:

Figs. 1, 2, and 3 are side elevational views showing the adaptation of a preferred embodiment of my invention to a tractor and illustrate a preferred manner of operation as well as different operating positions of the parts;

Fig. 4 is a rear end elevational view of a preferred type of logging pan, having attached thereto a form of bridle which constitutes a desirable part of my logging apparatus;

Figs. 5 and 6 are, respectively, top and fragmentary end elevational views of the logging pan shown in Figs. 1 to 4, inclusive;

Fig. 7 is a side sectional view of the logging pan with the section taken substantially on the line 7—7 of Fig. 5; and Fig. 8 is a fragmentary side elevational view depicting a preferred type of coupling adapted to use as a part of my logging apparatus.

In the exemplary embodiment of my invention which is disclosed in the drawings, a logging pan 10 is adapted to use in association with a tractor 12 or the like for supporting the front end of a log, such as 13, as that log is dragged from one position to another. It is generally desirable in such work to utilize a tractor having a winch such as 14 mounted at the rear thereof and in a somewhat elevated position. The winch 14 is utilized to store and to apply pulling force to a dragline 15 which has at its outer end a choker noose such as 16 adapted to encircle and grip the end of the log 13.

The logging pan 10, which comprises a part of my disclosed logging apparatus, desirably is generally triangular in shape, as shown in Fig. 5, with a relatively narrow and upwardly curved front end portion 17, and a wide rear end portion. The front end portion, being narrow, provides ample space at both sides so that it will not interfere with the tractor wheels or treads when closely coupled to the tractor and although it is turned laterally with reference to the tractor axis. To effect desirable symmetry and balance, the outer contour of the pan is symmetrical with respect to the longitudinal center line. The forwardly facing edges of the pan are turned upwardly to provide side flanges 18 and a front flange 19. On its lower surface the pan has a plurality of longitudinally extending and integrally formed skid ribs 20 which serve as runners and also strengthen the pan structure. Integrally formed lateral ribs 22 extend across the upper surface of the pan in longitudinally spaced relationship. One of the ribs 22 is near the rear end of the pan, and the other, at the mid portion.

At the front end of the pan a centrally disposed opening 23 in the front flange 19 is provided for making connection to the tractor 12 through a suitable coupling 24. Desirably, the tractor is provided with a drawbar 25 to which the coupling 24 is connected. In order to provide improved control of the movements of a log while it is being dragged, the coupling 24 is short and the pan is so disposed with respect to the tractor and winch that the front end of the log may be closely snubbed with respect to the tractor, as shown in Fig. 2. An additional advantage of a short coupling of the type disclosed is that the pan may be readily steered and manipulated during reverse movements of the tractor so as to promote ease of the mounting of the front end of a log thereon.

My preferred type of coupling includes a substantially U-shaped coupling element 26 at one end which extends through the opening 23 in the front flange of the pan and is rotatably connected to a second coupling element 27 by fastening means such as a bolt 28. The second, or front coupling element 27, is hingedly connected to the drawbar 25 by fastening means such as a pin 29. The axes of the pin 29 and the bolt 28 are transversely disposed so as to provide for both lateral and vertical swinging movement.

In the mid-portion of the upper surface of the pan, and desirably toward the rear end thereof, a bridle 30 is connected thereto. This bridle serves as a part of my preferred logging apparatus and includes a central yoke 32 having flexible connecting elements such as chains 33 connected to the opposite ends thereof. Although there are various ways in which the outer ends of the chains 33 might be connected to the pan, I have provided a pair of upwardly projecting lugs 34 which are integrally formed with the pan and are disposed in spaced relationship and equidistantly on opposite sides of the longitudinal center line of the pan. The outer links of the chains 33 extend through suitable openings 35 in the lugs. A hook 36 is secured to the mid-portion of the yoke 32 and projects from the yoke to provide an element releasably engageable with the dragline 15.

Through the use of the short coupling 24 through which the front end of the pan may be supported from the drawbar 25, and by connecting the hook 36 to the dragline 15, as shown in Fig. 1, after the dragline has been connected to a log the dragline may be tightened by the operation of the winch 14 on the tractor and maintained in such tightened relation as the tractor is moved rearwardly toward the log. During this operation the pan 10 is raised from the surface of the ground to a position such as that indicated in dot and dash lines at 10a, while the dragline and bridle assume positions such as those indicated in dot and dash lines at 15a and 30a, respectively. As the tractor moves rearwardly and the dragline is kept taut by the operation of the winch, the hook 36 slides along the dragline toward the log. By thus holding the pan in an elevated position during its movement toward the log, the movement is made easier by preventing the pan from digging into the earth, and the dragline serves to steer the pan toward the end of the log.

Since the coupling 24 is short and movable to fixed positions, although flexible, the pan may be positioned at the end of the log by appropriate movements of the tractor. After such positioning of the pan, the log is pulled over the upper surface of the pan by operation of the winch to a position such that the end of the log is closely adjacent the back of the tractor. In a position such as that shown in Fig. 2, one or more logs may be dragged to a desired destination and over rough ground by forward movement of the tractor.

On a return trip, or during any movement of the tractor when a log is not attached thereto and when the disconnecting of the pan from the tractor is not desired, my disclosed apparatus makes possible the placement of the pan in the carrying position which is shown in Fig. 3. In this position the relatively short coupling 24 supports the front end of the pan while the bridle 30 is connected to the dragline 15 and the dragline is wound upon the winch 14 to hold the rear end of the pan in an elevated position adjacent the rear of the tractor. To effect the movement of the pan to the carrying position, the hook 36 need only be hooked over dragline 15 as the dragline is drawn in by the winch. The choker rigging at the end of the dragline engages the hook when reached and raises the pan, with the coupling 24 serving as a hinge. The position and length of the bridle 30 are desirably such that the pan naturally assumes a laterally balanced position relative to the back of the tractor. The lateral span of the bridle 30 provides adequate lateral support for the pan in the carrying position. When the bridle is not in use for either carrying the pan, as shown in Fig. 3, or elevating the pan during rearward movements of the tractor, as shown in Fig. 1, as when a log is being carried, it conveniently collapses and falls to an out-of-the-way position on the surface of the pan.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. Logging apparatus adapted for use with a tractor having a drawbar and a winch with a dragline connected thereto and comprising, in combination, a logging pan of generally triangular shape and having a narrow front end curved upwardly and a relatively wide back end, a centrally disposed opening in the front end, a coupling comprising a universal joint and having a loop at one end extending through said central opening for connecting the pan in closely coupled relationship to the drawbar, a pair of laterally separated lugs extending upwardly from the upper surface of the pan near the rear end thereof, and a bridle having a centrally disposed yoke with a hook extending therefrom and flexible means connecting the ends of the yoke to said lugs, said hook being adapted for releasable connection to the dragline for swinging the pan upwardly about said coupling.

2. Logging apparatus adapted for use with a tractor having a drawbar and a winch with a dragline connected thereto and comprising, in combination, a logging pan of generally triangular shape and having a narrow front end curved upwardly and a relatively wide back end, a centrally disposed opening in the front end, a coupling comprising a universal joint and having a loop at one end extending through said central opening for connecting the pan in closely coupled relationship to the drawbar, a pair of laterally separated lugs extending upwardly from the upper surface of the pan near the rear end thereof, and flexible bridle means connected to said lugs and having a centrally disposed hook adapted for releasable connection to the dragline.

3. Logging apparatus adapted for use with a tractor having a drawbar and a winch with a dragline connected thereto and comprising, in combination, a logging pan of generally triangular shape and having a narrow front end curved upwardly and a relatively wide back end, a centrally disposed opening in the front end, a coupling comprising a universal joint and having a loop at one end extending through said central opening for connecting the pan in closely coupled relationship to the drawbar, and means for flexibly connecting a hook to the mid-portion of the upper surface of the pan, said hook being adapted to releasable connection to the dragline.

4. In logging apparatus adapted for use with a tractor having a drawbar, the combination comprising a logging pan of generally triangular shape and having a narrow front end curved upwardly and a relatively wide back end, said pan being shaped symmetrically laterally with respect to a longitudinal center line, a centrally disposed opening in the front end of the pan, and a coupling for connecting the pan to the drawbar, said coupling comprising a universal joint having end portions connected for rotation about an axis in one plane, one of said portions being substantially U-shaped and extending through said opening in the pan, and the other of said portions being adapted for connection to said drawbar for rotation about an axis in a plane transverse to the previously mentioned plane.

5. In logging apparatus adapted for use with a tractor having a drawbar, the combination comprising a logging pan having an upwardly curved front end, said pan being symmetrically shaped laterally with respect to a longitudinal center line and having at its front end a centrally disposed opening, and a coupling for connecting the pan to the drawbar, said coupling comprising a universal joint having end portions connected for rotation about an axis in one plane, one of said portions being substantially U-shaped and extending through said opening in the pan, and the other of said portions being adapted for connection to said drawbar for rotation about an axis in a plane transverse to the previously mentioned plane.

6. In logging apparatus adapted for use with a tractor having a winch used in association with a dragline, the combination comprising a logging pan symmetrically shaped laterally with respect to a longitudinal center line and having an upwardly curved front end, a pair of lugs separated laterally and symmetrically with respect to said center line, said lugs projecting upwardly from the mid-portion of the top surface of the pan, a bridle including flexible connecting means connected to and extending loosely between said lugs, and said bridle having at the mid-portion thereof fastening means adapted releasable to connect to said dragline.

7. In logging apparatus the combination comprising a logging pan of generally triangular shape having a relatively narrow front end curved upwardly, said pan being laterally symmetrical with respect to a longitudinal center line, integral skid ribs extending longitudinally along the lower surface of the pan, lateral reinforcing ribs on the upper surface of the pan, and a pair of lugs extending upwardly from the upper surface of the pan at positions equidistantly spaced laterally from said longitudinal center line.

8. Logging apparatus comprising, in combination, a logging pan having an upwardly curved front end, a relatively short hinge type coupling secured to the front end of the pan and having parts permitting swinging movement of the pan about closely disposed axes in different planes, and a bridle secured to the mid-portion of the pan at laterally spaced positions, said bridle including flexible means and a centrally disposed fastening element.

JESSE L. HURD.